(12) United States Patent
Rupp

(10) Patent No.: US 7,620,764 B2
(45) Date of Patent: Nov. 17, 2009

(54) SYSTEM, APPARATUS AND METHOD FOR DATA PATH ROUTING CONFIGURABLE TO PERFORM DYNAMIC BIT PERMUTATIONS

(75) Inventor: Charle' R. Rupp, Morgan Hill, CA (US)

(73) Assignee: Stretch, Inc., Sunnyvale, CA (US)

( * ) Notice: Subject to any disclaimer, the term of this patent is extended or adjusted under 35 U.S.C. 154(b) by 0 days.

(21) Appl. No.: 11/768,113

(22) Filed: Jun. 25, 2007

(65) Prior Publication Data
US 2007/0250656 A1 Oct. 25, 2007

Related U.S. Application Data

(62) Division of application No. 10/931,491, filed on Aug. 31, 2004, now Pat. No. 7,237,055.

(60) Provisional application No. 60/513,643, filed on Oct. 22, 2003.

(51) Int. Cl.
*G06F 13/00* (2006.01)
*G06F 9/00* (2006.01)

(52) U.S. Cl. ...................... 710/317; 712/221

(58) Field of Classification Search .............. 710/317, 710/316; 712/11, 15, 221, 223, 7
See application file for complete search history.

(56) References Cited

U.S. PATENT DOCUMENTS

| | | |
|---|---|---|
| 5,055,997 A | 10/1991 | Sluijter et al. |
| 5,247,689 A | 9/1993 | Ewert |
| 5,274,782 A | 12/1993 | Chalasani et al. |
| 5,293,489 A | 3/1994 | Furui et al. |
| 5,299,317 A | 3/1994 | Chen et al. |
| 5,471,628 A | 11/1995 | Phillips et al. |
| 5,684,980 A | 11/1997 | Casselman |
| 5,850,564 A | 12/1998 | Ting et al. |
| 6,092,174 A | 7/2000 | Roussakov |
| 6,167,502 A | 12/2000 | Pechanek et al. |
| 6,343,337 B1 | 1/2002 | Dubey et al. |
| 6,557,092 B1 | 4/2003 | Callen |
| 6,633,181 B1 | 10/2003 | Rupp |
| 6,721,884 B1 | 4/2004 | De Oliveira Kastrup Pereira et al. |
| 6,831,690 B1 | 12/2004 | John et al. |
| 6,883,084 B1 | 4/2005 | Donohoe |

(Continued)

OTHER PUBLICATIONS

Xilinx, "Virtex™ 2.5 V Field Programmable Gate Arrays, Product Specification," DS003-2 (v2.8.1) Dec. 9, 2002, pp. 1-20.

(Continued)

*Primary Examiner*—Mark Rinehart
*Assistant Examiner*—Trisha Vu
(74) *Attorney, Agent, or Firm*—Cooley Godward Kronish LLP

(57) ABSTRACT

A system, apparatus and a method for routing data over fewer switches and interconnections among reconfigurable logic elements, and for adapting routing resources to dynamically perform complex bit-level permutations, such as shifting and bit reversal operations. In one embodiment, an exemplary silo routing circuit is formed upon a semiconductor substrate and routes data among a number of reconfigurable computational elements. The silo routing circuit comprises a plurality of input terminals and a plurality of output terminals. Further, the silo routing circuit includes a multi-stage interconnection network ("MIN") of switches configurable to form data paths from any input terminal to any output terminal.

10 Claims, 14 Drawing Sheets

U.S. PATENT DOCUMENTS

| | | |
|---|---|---|
| 6,996,709 B2 | 2/2006 | Arnold et al. |
| 2003/0046513 A1 | 3/2003 | Furuta et al. |
| 2004/0186872 A1 | 9/2004 | Rupp |
| 2004/0193852 A1 | 9/2004 | Johnson |
| 2005/0027970 A1 | 2/2005 | Arnold et al. |
| 2005/0027971 A1 | 2/2005 | Williams et al. |

OTHER PUBLICATIONS

Michael J. Wirthlin et al. "DISC: The dynamic instruction set computer," Proceedings SPIE, Field Programmable Gate arrays (FPGAs) for Fast Board Development and Reconfigurable Computing, Oct. 25-26, 1995, 14 pages.

Hwang, Kai "Advanced Computer Architecture: Parallelism, Scalability, Programmability," 1st Edition, Chapter 2, pp. 75-97; copyright 1993; by McGraw-Hill, Inc.; USA.

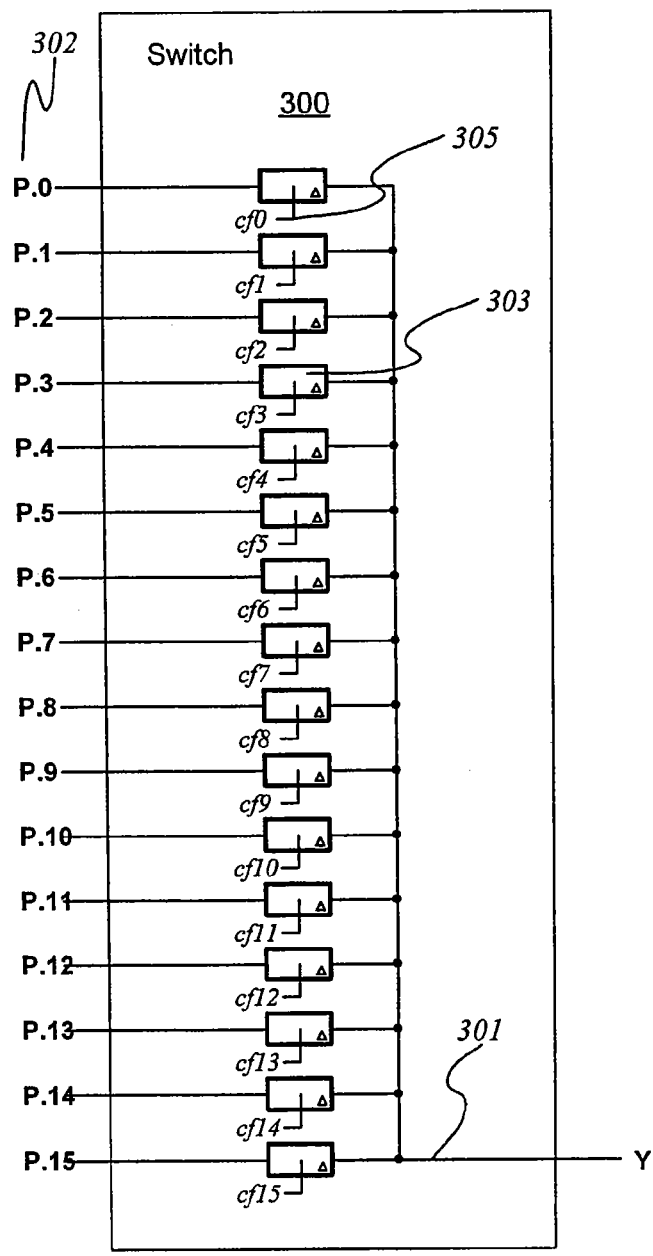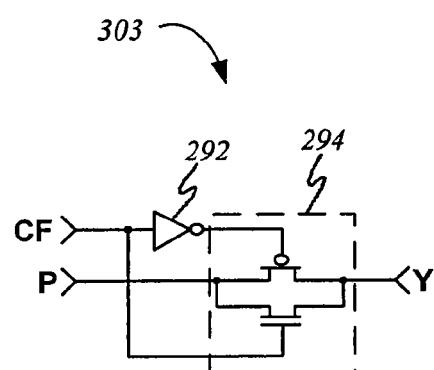
FIG. 2A
(Prior Art)
FIG. 2B
(Prior Art)

US 7,620,764 B2

SYSTEM, APPARATUS AND METHOD FOR DATA PATH ROUTING CONFIGURABLE TO PERFORM DYNAMIC BIT PERMUTATIONS

CLAIM OF PRIORITY

This application is a Divisional of application Ser. No. 10/931,491, filed Aug. 31, 2004 (now U.S. Pat. No. 7,237,055), which claims the benefit of Provisional Application No. 60/513,643, filed on Oct. 22, 2003, both of which are incorporated by reference in their entirety for all purposes.

FIELD OF THE INVENTION

The present invention relates generally to microprocessor architecture and reconfigurable processing. More particularly, the present invention relates to a system, apparatus and a method for routing data over fewer switches and interconnections among reconfigurable logic elements, and for adapting routing resources to dynamically perform complex bit-level permutations, such as shifting and bit reversal operations.

BACKGROUND OF THE INVENTION

As individual reconfigurable computational elements are adapted to perform more complex logic, arithmetic, and other processor-oriented functions, at least two vital structural components have emerged as impediments to efficient use of computational resources and to enhanced performance of reconfigurable processors. These two structural components are: (1) the programmable routing resources disposed within reconfigurable logic arrays, and (2) the bit permutation resources that are programmatically formed from reconfigurable computational elements.

As to the latter, specialized permutations circuits functions, such as shifting circuits, have been traditionally formed by programming reconfigurable computational elements to perform such functions. In conventional designs, a significant amount of computational resources are dedicated to support these shifter circuits and bit-manipulative circuits, which consume a relatively large amount of circuit area. Regarding the former, programmable routing resources (or routing networks) are crucial to connect an output of any one reconfigurable element to an input of any other reconfigurable element. To do so, reconfigurable computational elements as well as switches generally require configuration data to program their respective functionalities, which includes routing data. But as those functionalities become increasingly complex, the number of interconnections also increases, which thereby further burdens the routing resources. As a result, the increased number of interconnections in routing resources causes circuit area and timing delays to increase correspondingly.

FIG. 1 illustrates a conventional routing network typically formed within a reconfigurable logic array 100. Reconfigurable logic array 100 includes a number of Arithmetic Logic Elements ("ALEs") 101, 105, 106, 107 and 109 as reconfigurable computational elements for performing logic and arithmetic functions and requires a number of routing resources. First, a typical ALE 101 requires interconnections for receiving configuration data bits to implement logic functions and also requires interconnections between one to two logic outputs and three or more logic inputs to a routing network. Horizontal routing blocks 102 and vertical routing blocks 103 represent the routing network and each typically consist of a large number of switches for routing data among ALEs 101. Also, a large number of interconnections reside in routing blocks 102, 103 to support transport of configuration data bits to control the data path routings. For example, switches and interconnects at cross-bar routing block 108 must be sufficient to configure the routing of the output of ALE 105 to the input of ALE 109 by first routing data over one of horizontal routing blocks 102 and then routing data over one of vertical routing blocks 103.

FIG. 2A depicts a switch circuit 300 commonly used to facilitate data path routing in routing blocks 102, 103 of FIG. 1. Switch circuit 300 is a 16 input-to-1 output routing block that selects any one input 302 (e.g., any input P.0 to input P.15) and then routes data from a selected input 302 via an enabled cross-point gate 303 to output ("Y") 301. In operation, at most one static configuration signal 305 (i.e., any signal from "cf0" to "cf15") controls the activation of a specific cross-point gate 303. Static configuration signal 305 is a "static" signal. That is, it is generated by a specific configuration register, the contents of which are loaded when reconfigurable logic array 100 is initialized. Thereafter, the state of the static signals remains unchanged. FIG. 2B illustrates a typical implementation of cross-point gate 303 of FIG. 2A including an inverter 292 and a complementary metal-oxide semiconductor ("CMOS") transmission gate 294 to operate as a three-state switch.

FIG. 3 depicts a cross-bar routing block 108 for routing data via switch circuits 300 between the outputs and the inputs of the reconfigurable computational elements. In particular, FIG. 3 shows a specific data path for routing data from ALE (1) 106 to ALE (2) 107 as determined by the configuration bits routed into cross-bar routing block 108. Each of sixteen outputs from "O/P 0" to "O/P 16" of ALE (1) 106 is connected to a separate vertical switch in vertical routing blocks 103. Each of sixteen inputs from "I/P 0" to "I/P 16" of ALE (2) 107 is connected to a separate horizontal switch in horizontal routing blocks 102. As shown, output O/P 0 is connected to vertical switch ("SW-1V") 320a, which is a separate switch than switch ("SW-16V") 320b. Also, input I/P 16 is connected to horizontal switch ("SW-16H") 322b, which is separate from switch ("SW-1H") 322a for input I/P 0. Although omitted for purposes of discussion, other inputs and outputs each require a similar number of separate horizontal and vertical switches. Therefore, cross-bar routing block 108 does not use fifteen inputs of each switch and corresponding interconnections at any one time, which decreases the efficacy of cross-bar routing block 108 to maximize the use of its circuitry. Moreover, the relatively large number of switch circuits 300 consume circuit area that otherwise could be used for other purposes.

As an example, consider that cross-bar routing blocks 108 are used to route data in reconfigurable logic array 100 of N rows by N columns of reconfigurable computational elements, where "N" is 64. Further consider a simple case where there are only two inputs per reconfigurable computational element. As such, there would be a total of $N^2$ or 4,096 reconfigurable computational elements requiring a total of 8,192 cross-bar routing blocks 108. As the combination of cross-bar routing blocks 108 would then yield 4,096 inputs, then a total of 33,554,432 switch circuits 300 would be needed (as well as an equivalent same number of configuration registers and corresponding bit paths).

A common approach to reduce routing resources requirements for a reconfigurable logic array includes adding one or more stages to form a multi-stage routing network, but retaining the use of cross-bar routing block 108. In this approach, either a set of horizontal routing blocks are configured to drive a set of vertical routing blocks, or vice versa. Or, these two approaches can be mixed as demonstrated in U.S. Pat. No. 6,633,181 B1, entitled "Multi-Scale Programmable Array," which is commonly owned by the owner of this application and is incorporated by reference in its entirety for all purposes. For example, for each row and column, there is a first stage of K switches with N inputs per switch and then a second stage of switches for each of the inputs with K inputs per switch. To compare the reduction of switches and interconnections in view of the previous example, consider K=64, such that there will 64 first stage routing circuits per row and 2*N second stage routing circuits per column, thus the total number of switches required for horizontal routing is 64*64*64=262,144, and the number of switches for vertical routing is 2*64*64*64=524,288. The total number of switches for this approach is 786,432. Although this approach reduces circuit area, there might be an increase in complexity in the placement of functions as well as a possible increase in delay time between the source and the destination for each path. A further reduction in cost might be achieved by adding more routing stages, but the increased number of routing stages makes computing the optimal routing paths for a given placement of functions very difficult.

Thus, there is a need for a system, an apparatus and a method for routing data over fewer switches and interconnections among reconfigurable logic elements to conserve reconfigurable computational elements without substantially increasing the difficulty of computing routing paths, and for adapting routing resources to dynamically perform complex bit-level operations.

SUMMARY OF THE INVENTION

A system, apparatus and a method are disclosed for routing data over fewer switches and interconnections among reconfigurable logic elements, and for adapting routing resources to dynamically perform complex bit-level permutations, such as shifting and bit reversal operations. In one embodiment, an exemplary silo routing circuit is formed upon a semiconductor substrate and routes data among a number of reconfigurable computational elements. The silo routing circuit comprises input terminals and output terminals. Further, the silo routing circuit includes a multi-stage interconnection network ("MIN") of switches configurable to form data paths from any input terminal to any output terminal. In another embodiment, a silo routing circuit includes configuration data terminals to select a subset of switches to form one path from the data paths from the input terminal to either a first output terminal or to a second output terminal, the second output terminal being at a distance from the first output terminal. In a specific embodiment of the present invention, the silo routing circuit is such that each switch of the selected subset is further configured to either statically route data from the input terminal to either the first output terminal or the second output terminal in accordance with a bit of a bit vector, or to dynamically route data from the input terminal to a third output terminal in accordance with a dynamic control signal.

In another embodiment, a reconfigurable logic array for implementing a reconfigurable data-path processor is formed on a semiconductor substrate. The reconfigurable logic array comprises reconfigurable computational elements and silo routers, each of which includes silo router circuits located between at least a first reconfigurable computational element and a second reconfigurable computational element. The silo routers are configured to perform bit permutations on data exiting the first reconfigurable computational element and entering the second reconfigurable computational element. In a specific embodiment, the silo routers are further configured to route data from the first reconfigurable computational element to the second reconfigurable computational element substantially orthogonal to data flowing through the first and the second reconfigurable computational elements. In one embodiment, the reconfigurable logic array further comprises dynamic switches, each configurable to either statically route data or dynamically route data from the first reconfigurable computational element to the second reconfigurable computational element.

In still another embodiment, a method of manufacturing a silo routing circuit on a semiconductor substrate is disclosed. The method comprises forming between reconfigurable computational elements a quantity of "N" rows of switches, each row including a quantity of "M" switches with each switch being in a $k^{th}$ stage, forming a connection from a first input for a first stage switch in a row to an input terminal in the row and connecting each of other first inputs for subsequent stage switches to outputs of preceding stage switches in the row. Then, a connection is formed from a second input of the first stage switch to another input terminal in another row located at a distance $2^{M-k}$ from the row, where k=1 for the first stage switch and a connection is formed for each of the other second inputs in subsequent stage switches to outputs of preceding stage switches at a distance $2^{M-k}$ from the row, where k>1 for any of the subsequent stage switches.

BRIEF DESCRIPTION OF THE DRAWINGS

A more complete understanding of the present invention is apparent and more readily appreciated by reference to the following Detailed Description and to the appended claims when taken in conjunction with the accompanying Drawings wherein:

FIGS. 2A and 2B depict a switch circuit that is commonly used to provide data path routing in vertical and horizontal routing blocks;

DETAILED DESCRIPTION OF EXEMPLARY EMBODIMENTS

Figure 1:
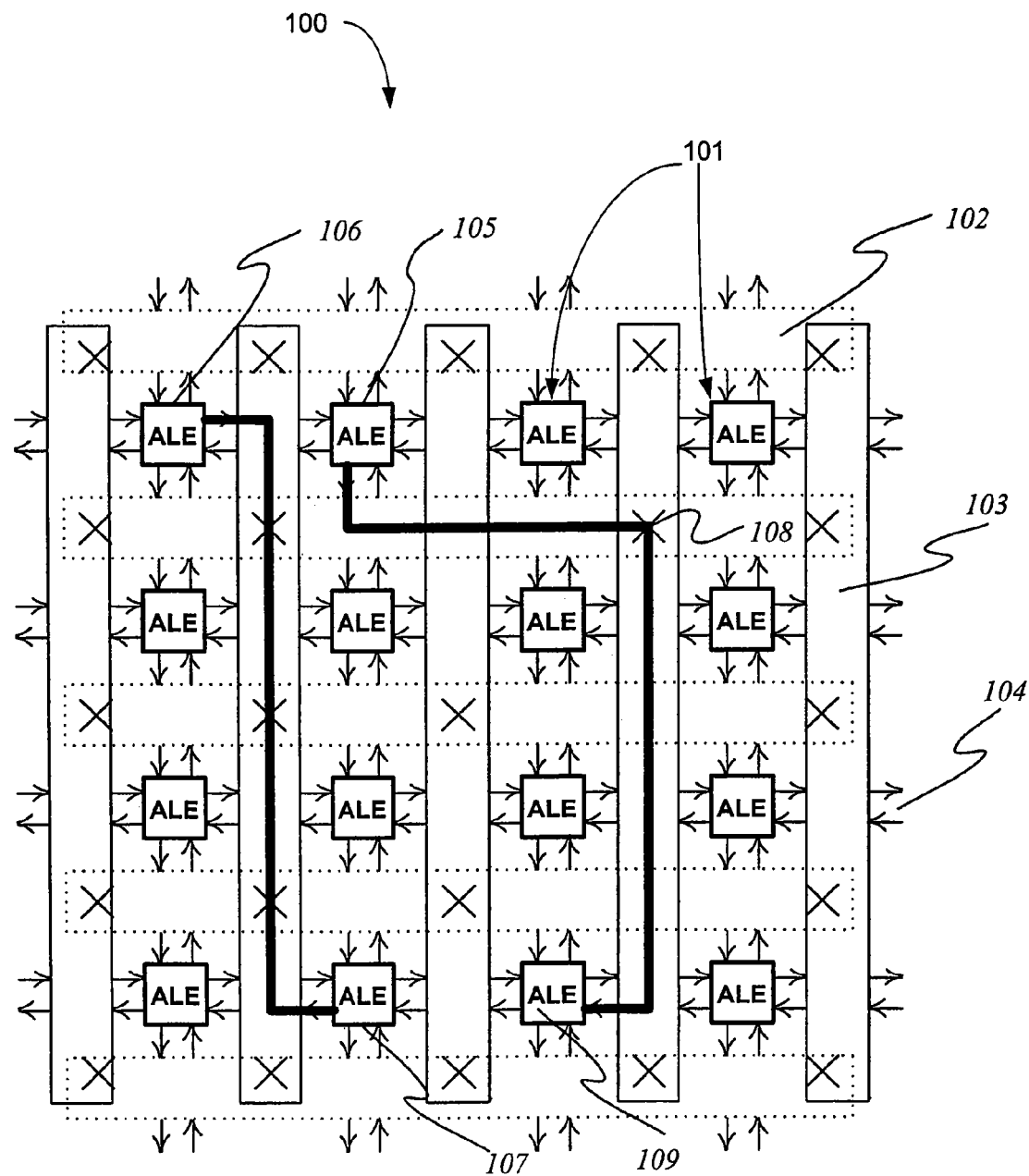
FIG. 1 illustrates a conventional routing network typically formed within a reconfigurable logic array.
Figure 3:
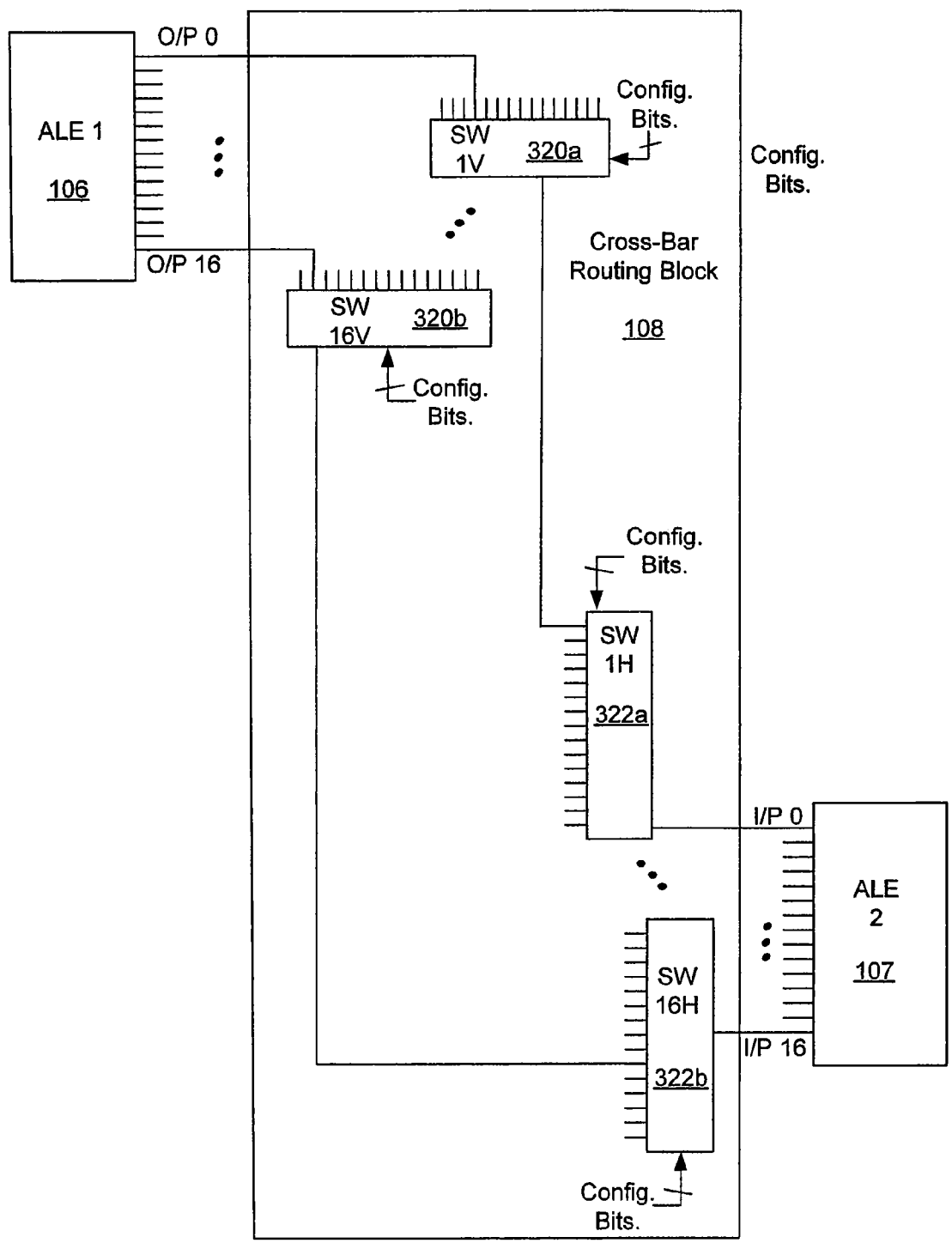
FIG. 3 depicts a cross-bar routing block for routing data via switch circuits of FIG. 2 from the output of one reconfigurable computational element to another such element in a conventional reconfigurable logic array.
Figure 4:
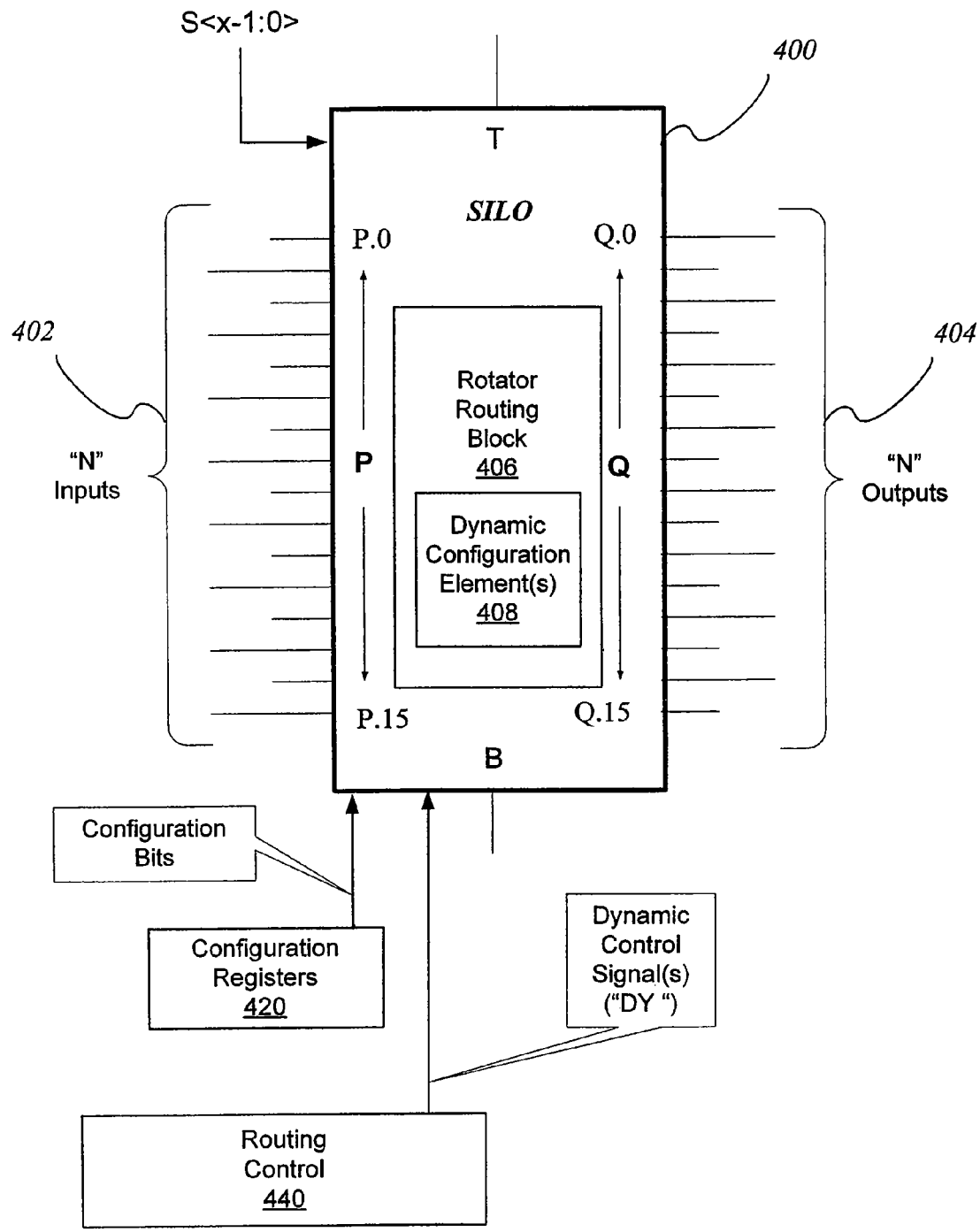
FIG. 4 is a diagrammatic representation of an exemplary silo routing circuit for implementing routing resources within an array of reconfigurable computational elements, according to one embodiment of the present invention.

FIG. 4 is a schematic representation illustrating an exemplary silo routing circuit for implementing routing resources within an array of reconfigurable computational elements, according to one embodiment of the present invention. An exemplary silo routing circuit ("Silo") 400 is a multi-stage interconnection network ("MIN") configured to route data through any one of N inputs 402 to any one or more of N outputs 404 and is generally formed as an integrated circuit on at least one semiconductor substrate. In particular, silo routing circuit 400 is a MIN adapted to route data bits while optionally performing bit permutations. As such, silo routing circuit ("Silo") 400 can statically route data in accordance with configuration data derived from MIN principles as well as perform dynamical routing of data. In some embodiments of the present invention, "static routing" of data generally refers to the unaltered or unmodified transfer of data from at least one reconfigurable computational element to another, whereas the "dynamic routing" of data generally includes performing a bit permutation, such that the data is modified either as part of or separate from the transfer of data. This and other aspects of silo routing circuit 400, especially as a MIN, are discussed further below. A "silo" routing circuit is a circuit based on the principles of multi-stage interconnection networks that performs and facilitates the routing of data generally orthogonal to the flow of data generated from computations of processing elements, such as a reconfigurable computational element.

In this example, silo routing circuit 400 is a 16 input-to-16 output routing block configured to route any one of inputs 402 (i.e., P.0 to P.15) to any one of outputs 404 (i.e., Q.0 to Q.15). Control signal "S" is an x-bit signal ("<x−1:0>"), such as a four-bit signal (i.e., x=4), for selecting which outputs will receive which specific input. Silo routing circuit 400 is a type of router block that is configured to implement a number of useful "permutations" of the inputs including bit rotation, bit shift left, bit shift right and various types of bit reversal, bit swapping, and other permutations in addition to the routing of data. But rather than configuring reconfigurable computational elements to perform such functions, silo routing circuit 400 is configured to do these functions within the infrastructure of the routing network. A reconfigurable computational element generally includes programmable circuits to perform logic, arithmetic or similar functions. One example of a reconfigurable computational element is an Arithmetic Logic Element ("ALE") as described in U.S. Pat. No. 6,633,181 B1, entitled "Multi-Scale Programmable Array."

As shown, silo routing circuit 400 includes a rotator routing block 406 and optional dynamic configuration elements 408. In one embodiment, rotator routing block 406 enables each of the N inputs 402 of silo routing circuit 400 to have a distinct path to exactly one of N outputs 404, simultaneously with other inputs or otherwise, according to a specific embodiment of the present invention. In a specific embodiment, silo routing circuit 400 is configured to receive configuration data from configuration registers 420, which are located external to silo routing circuit 400, and is further configured to receive dynamical control signals "DY" from routing control 440. In some cases, routing control 440 is part of the functionality of a particular reconfigurable computation element that is routing data through silo routing circuit 400 and signal DY is generated based on the particular results of that element.

In at least one specific embodiment of the present invention, dynamic configuration elements 408 are implemented to obtain configuration data for rotator routing block 406 on the same wires that are normally used for data flow that results from computations. Consequently, dynamic configuration elements 408 facilitate the further reduction of circuit area that otherwise would be consumed by interconnects that are dedicated to transporting configuration data alone. "Configuration data" refers generally to that data used to configure, for example, rotator routing block 406 to (1) select one or more specific input and output paths, and/or (2) perform a specific bit manipulation function (i.e., permutations of inputs 402) as defined by such configuration data. In one embodiment, configuration data is a number of bits that control how specific binary switches within rotator routing block 406 are to behave.

Silo routing circuit 400 can be configured to couple to one of any number of other silo routing circuits 400 at either input(s) "T" (i.e., one or more top inputs) or output(s) "B" (i.e., one or more bottom inputs) to respective input(s) "B" and output(s) "T" of other silo routing circuits 400. Two or more silo routing circuits 400 coupled in this manner are referred as a "silo router" and provide for "transitive routing" as a routing resource. Transitive routing refers to the flow of data that is generally orthogonal to the flow of data that cascades through inputs and outputs of the reconfigurable computational elements, the direction of which is normally referred to as the "horizontal direction" in the art of reconfigurable processing.

Figure 5A:
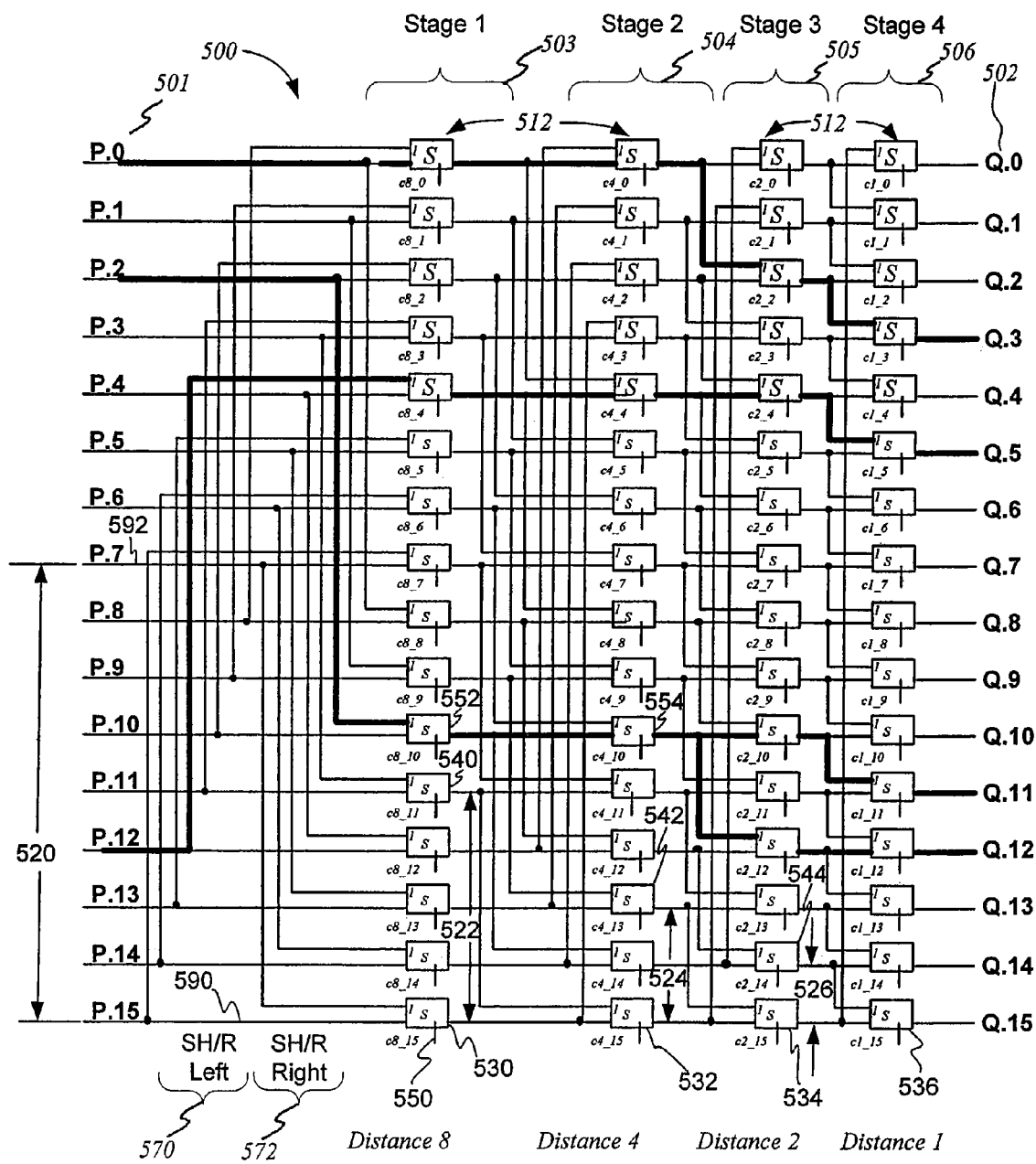
FIG. 5A illustrates an example of a rotator routing block, according to one embodiment of the present invention.

FIG. 5A illustrates a rotator routing block, according to one embodiment of the present invention. Rotator routing circuit 500 is a multi-staged routing block composed of four stages: a first stage ("stage 1") 503, a second stage ("stage 2") 504, a third stage ("stage 3") 505 and a fourth stage ("stage 4") 506. Rotator routing circuit 500 has sixteen inputs 501 (e.g., P.0 through P.15) and sixteen outputs 502 (e.g., Q.0 through Q.15). In each stage, there are sixteen switches, each switch 512 being configured to receive at least two inputs and to provide one output. Each similarly numbered input 501 and output 502, such as P.15 and Q.15, respectively, correspond to a row of switches 502. Whereas at least a first input of each switch 512 is configured to receive data from the row in which it resides, the second input is configured to receive an input from a source that is located at a certain "vertical distance" from that particular switch 512. Hereinafter, the first input for any switch will be identified either as "input 0" or "L0 input," and the second input for any switch will be identified either as "input 1" or "L1 input." Note that although the terms "vertical distance" and "distance" are interchangeable, the term "vertical distance" is generally used to describe the displacement between two switches (typically in adjacent stages), and the term "distance" is generally being used to describe the displacement in the number of rows from an input P to an output Q.

The stage determines the vertical distance from the source to the L1 input of each switch 512 in that particular stage. First stage 503 provides a vertical distance of eight between inputs to any switch 512 in that stage. For example, switch 530 receives an L0 input as input ("P.15") 590 and an L1 input as input ("P.7") 592, which is at a vertical distance 520 of eight. Second stage 504 provides a vertical distance of four between inputs to any switch 512 in that stage. For example, switch 532 receives an L0 input from switch 530 and an L1 input from switch 540, which is at a vertical distance 522 of four. Similarly, switches 534 and 536 have inputs L1 receiving data from vertical distances of 524 (i.e., distance of two) and 526 (i.e., distance of one), respectively, from other switches 542 and 544.

Configuration data bits govern the formation of the routing paths in rotator routing circuit 500. In particular, a bit vector of four bits in this example determines to which output a particular input will be routed. Each bit of the bit vector is applied to a corresponding switch 512 in one of the four stages. As an example, a bit three from the right (i.e., $b_3$, with the right-most bit identified as $b_0$) of a bit vector relating to input P.15 would be applied to terminal 550 of switch 530. In accordance with a specific embodiment of the present invention, the bit vector is a difference in the displacement from an input 501 to the desired output of outputs 502.

For example, consider that input ("P.2") 501 is to be routed to output ("Q.12") 502, the path being drawn with a heavy line. The bit vector for setting (or resetting) switches 512 in the each stage "k" of four stages (i.e., where k is a value from 1 to 4) would be the numeric difference in the displacement from input P.2 to output Q.12. That is, the resulting difference is 10 (i.e., 12−2=10), of which the binary representation is "1010" ($b_3$=1, $b_2$=0, $b_1$=1, and $b_0$=0). As such, switches in the first and third stages need to be set to achieve the total distance of 10=8+0+2+0 for routing data from input P.2 to output Q.12. Notably, bit three (i.e. $b_3$) in the bit vector is the value of "1," which sets the switch 552 in first stage 503 to accept its L1 input (i.e., input "P.2" rather than input "P.10"). Bit two (i.e., $b_2$) in the bit vector is the value of "0," which resets switch 554 in second stage 504. By resetting this switch to the value of "0," switch 554 selects data from the L0 input rather than the L1 input (i.e., from the same row or from a vertical distance of zero). Bits $b_1$ and $b_0$ configure the remaining switches 512 in a similar fashion. In some embodiments, rotator routing circuit 500 can route one input to more than one output, as is exemplified in FIG. 5A. In this case, input P.2 can be routed (as shown by the heavy lines) to both Q.11 and Q.12. Also note that when the number of input 501 is less than the number of output 502, then the value of sixteen (i.e., the total number of inputs, N) is added to the difference. So for routing data from input P.12 to output Q.5, the bit vector for setting (or resetting) switches 512 is determined as follows. First, the difference between the numbers is initially determined to be −7 (i.e., 5−12=−7). Then, after 16 is added thereto, the difference is finally determined as +9 (e.g., −7+16), which has a binary representation of "1001." Therefore, the bit vector for routing data from input P.12 to output Q.5 is 1001 ($b_3$=1, $b_2$=0, $b_1$=0, and $b_0$=1).

Rotator routing circuit 500 is a multi-staged routing block and is formed, at least in part, by using multi-stage interconnection network ("MIN") techniques, the principles of which generally relate to the field of parallel processing and requires that there be at least one path from each input P to each output Q. In particular, rotator routing circuit 500 is an example of one type of MIN in accordance with the present invention. As such, a number of switches can be arranged in stages so that each switch in a particular stage is configured to receive data from at least $2^k$ input terminals, where k represents the number of the $k^{th}$ stage. Examples of this and other types of MINs for implementing rotator routing circuit 500 is described in chapter seven of "Advanced Computer Architecture: Parallelism, Scalability, Programmability" authored by Dr. Kai Hwang, $1^{st}$ edition, 1993, which is incorporated by reference for all purposes.

By using MIN techniques, this specific example of rotator routing circuit 500 provides a router block that can be implemented to form either vertical or horizontal routing blocks, or both, to at least minimize circuit area with respect to crossbar-block routing or other traditional routing approaches. For instance, consider that a reconfigurable logic array of 64 by 64 contains reconfigurable computational elements and that rotator routing circuit 500 is used to form both horizontal and vertical routing blocks for servicing 2 inputs for each reconfigurable computational element. As result, a routing resource thereby can be formed using about 73,278 switches (along with a similar number of interconnects for configuration register bits). This number is determined as follows: 64 bits per router * 6 switches per row *[64 horizontal routers+(64 vertical routers *2 inputs per row)]=73,278. In this case, these routers are 64-bit routers that can be composed of four integrated rotator routing circuits 500 similar to silo router 1200 of FIG. 12. As described, the number of switches in this case is less than otherwise would be required by most traditional routing approaches.

Other types and sizes of rotator routing circuits other than rotator routing circuits 500 can be realized as multi-staged routing blocks in accordance with MIN principles. For any size rotator routing circuit, M*N number of switches are required, where "N" is the number of inputs from inputs 501 and "M" is the total number of distinct switches for each path. Note that the number "M" typically coincides with the total number of stages. Number "k" uniquely identifies a specific stage k within 1 to M stages.

Figure 5B:
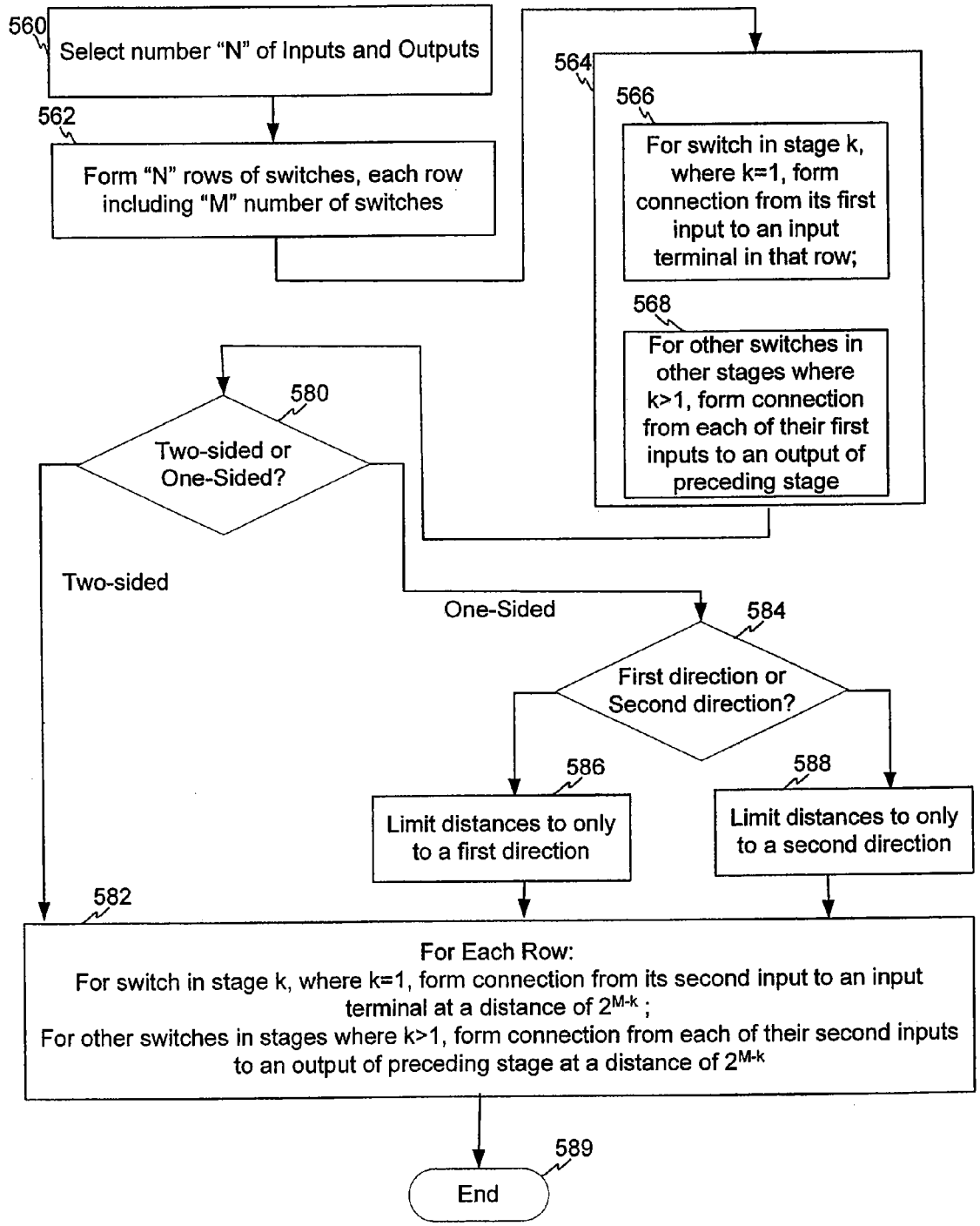
FIG. 5B illustrates an example of a method for forming a silo routing circuit, according to one embodiment of the present invention.

FIG. 5B is flow diagram of an exemplary method of constructing a rotator routing circuit in accordance with one embodiment of the present invention. At 560, a number of "N" inputs and outputs are selected, and at 562 "N" rows of switches are formed on one or more substrates (e.g., a semiconductor substrate) such that each row has "M" number of switches (one switch for each stage k). To construct a rotator routing circuit with "N" inputs, each $k^{th}$ stage (e.g., k=1, or first stage 503) is designed to cover a vertical distance of either 0 or N/2, whereas the next stage (e.g., k=2, or second stage 504) is designed to cover a distance of either 0 or N/4. The construction of such a rotator routing circuit continues through the remaining stages (e.g., k=3, or third stage 505) until the last stage (e.g., k=4, or fourth stage 506) at which the distance selection choice is either 0 or 1. Generally, the L1 input terminal of a switch in row J is connected to the L1 input terminal of another switch in row (J+N/2) mod N. The resulting rotatable routing block can implement any number of useful permutations of the inputs including rotation of values, shift left, shift right and various types of bit reversal.

At 564, inputs L0 of the switches are coupled. At 566, the L0 input of a switch in stage one (i.e., k=1) is coupled an input terminal in that row whereas subsequent switches (i.e., switches in stages k=2 and above) in that row have their respective inputs L0 coupled to a preceding switch of that row at 568. Then, a determination is made at 580 as to whether the rotator routing circuit is to be either two-sided (e.g., full rotating capabilities) or one-sided (e.g., restricted shifting capabilities). If it is to be two-sided, then inputs L1 of the switches are coupled at 582. Here, for each row, a switch in stage k=1 has its L1 input coupled to an input terminal at a vertical distance of $2^{M-k}$. But for other switches in stages k, where k>1, inputs L1 are connected to an output of a preceding stage (i.e., k-1) at a vertical distance of $2^{M-k}$. Notably, the vertical distances at 568 can be routed in any direction (e.g., in both negative and positive directions for providing both shift right and shift left capabilities). If the rotator routing circuit is to be one-sided, another determination is made at 584 as to whether the connections are to be formed either in a first direction (e.g., in negative direction) or at a second direction (e.g., in a positive direction). If the connections are to be formed in the first direction or the second direction, then those connections are so limited at 586 and 588, respectively. Thereafter, connections are formed for inputs L1 as prescribed at 582, but limited to only one direction. At 589, formation of the rotator routing circuit is terminated, with routing from any input $P_i$ to any output $Q_j$ determined by a generated bit vector based on distance, D, once it is desired to route data from input $P_i$ to output $Q_j$.

Note that in accordance with at least one embodiment of the present invention, a rotator routing circuit is constructed using any MIN or like techniques to compute the distance between any one input, P, of the N inputs 501 and any destination output, Q, of outputs 502. This distance is then used to form a bit vector for routing data. In a specific embodiment, rotator routing circuits are constructed in accordance with a rule where the modulus difference of the P and Q numbers is given by Equation 1. When P is less than Q, equation 1 can be expressed as equation 2. But when P is greater than Q, the distance value is given by equation 3.

$$D=(Q-P) \bmod N \quad \text{Equation (1)}$$

$$D=(Q-P) \quad \text{Equation (2)}$$

$$D=N+(Q-P) \quad \text{Equation (3)}$$

Note that equation 3 is applicable to the above example in determining a bit vector for forming a route from input P.12 to output Q.5 where N is sixteen. Note that when the magnitude of (Q-P) is positive, then the routing of a bit from P to Q is equivalent to "a shift left" operation and when the same magnitude is negative, then the routing of a bit from P to Q is equivalent to "a shift right" operation. Consequently, rotator routing circuits 500 and its equivalents, as MINs, can perform bit permutations in routing networks and/or during routing operations.

Figure 6A:
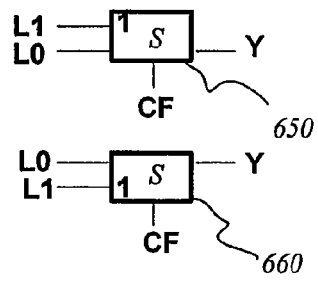
FIGS. 6A and 6B illustrate examples of switches, any of which is suitable for use as a switch for implementing with a rotatable routing circuit, according to a specific embodiment of the present invention.
Figure 6B:
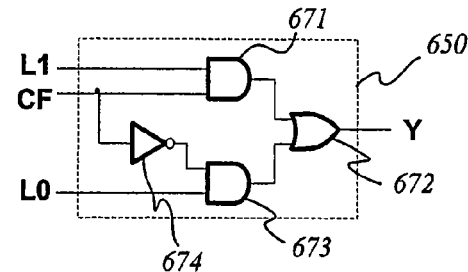

FIGS. 6A and 6B illustrate examples of switches suitable for use as switch 512 or any other switch for implementing a rotatable routing circuit, according to a specific embodiment of the present invention. Switches 650 and 660 are "binary switches" and operate similar to a multiplexing circuit. Each of binary switches 650 and 660 includes an L0 input terminal ("L0") and an L1 input terminal ("L1") as inputs, a terminal for receiving a configuration data bit ("CF"), and a binary switch output ("Y"). Binary switch 660 is similar to binary switch 650 but outputs different inputs for the same CF state. FIG. 6B depicts an exemplary binary switch 650, according to an embodiment of the present invention. The state of CF determines whether either the L0 input or the L1 input is selected. If CF is a logic low, then inverter 674 enables the L0 input (i.e., L0 ) from the same row to pass through gate 673 for output from gate 672 at terminal Y. But if CF is a logic high, then the L1 input (i.e., L1) from another row passes through gate 671 for output at terminal Y. Artisans of ordinary skill should appreciate that other switches are suitable for practicing switch 512 or any other switch described herein to build either a rotatable routing circuit or a silo routing circuit, according to various embodiments of the present invention.

Figure 7A:
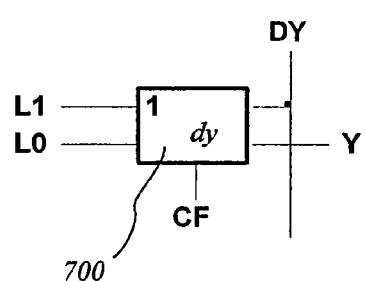
FIGS. 7A and 7B illustrate an example of a dynamic switch, according to a specific embodiment of the present invention.
Figure 7B:
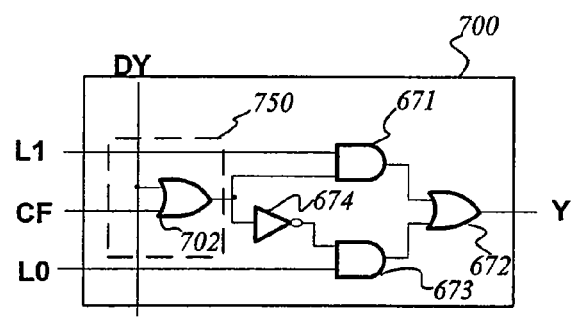

FIGS. 7A and 7B illustrate an example of a dynamic switch, according to a specific embodiment of the present invention. Dynamic switch 700 is similar in structure and functionality as switch 650, but includes a dynamic configuration element that can be implemented as at least one of dynamic configuration elements 408 of FIG. 4. Further, one or more dynamic switches 700 can be substituted with those switches of rotator routing circuit 500 to add dynamic capabilities thereto. Further, dynamic switch 700 is configured to receive and operate in response to a dynamic control signal ("DY"). When in one state, signal DY causes dynamic switch to operate as switch 650 to perform what is generally referred to as the "static routing." When in another state, signal DY enables silo routing circuit 400 to operate as a dynamic shift and/or rotate block to perform complex bit manipulations. This is generally referred to as "dynamic shifting or rotating" or as "dynamic operations." Again, static routing of data is generally the unaltered transfer of data between two points in an array, whereas the dynamic routing of data includes performing a bit permutation, such that the data is modified either as part of, or separate from the transfer of data.

FIG. 7B shows that dynamic switch 700 includes a dynamic configuration element 750 to facilitate dynamic operations. For static routing, dynamic control signals DY to all dynamic switches 700 are held low at a logic zero values so that the output of the OR-gate 702 is equal to the value of the configuration signal CF. OR-gate 702 can be referred to as a "dynamic control selector gate." In this case, dynamic switches 700 operates like switch 650. But if each of the configuration signals CF are programmed to be a logic zero value, then dynamic switches 700 are controlled by dynamic control signals DY, which then causes the overall rotator routing circuit to operate as a dynamic shift/and or rotate block.

Figure 8A:
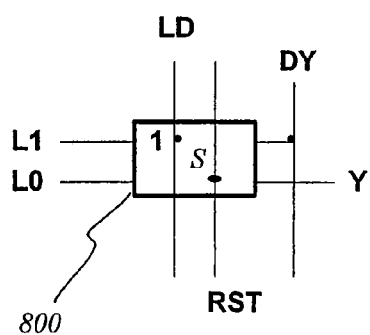
FIGS. 8A and 8B illustrate another example of a dynamic switch, according to a specific embodiment of the present invention.
Figure 8B:
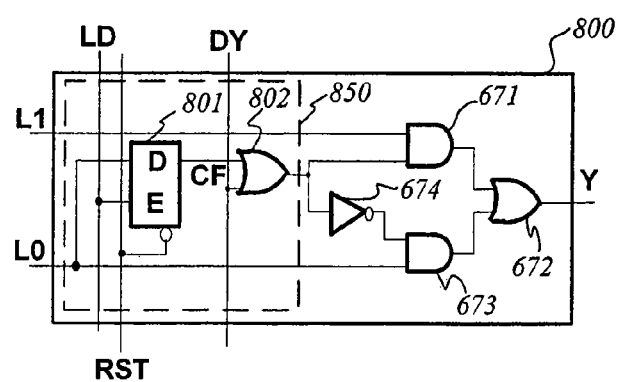

FIGS. 8A and 8B illustrate another example of a dynamic switch, according to a specific embodiment of the present invention. Dynamic switch 800 is similar in structure and functionality as switch 700, but includes a different dynamic configuration element that can be implemented as at least one of dynamic configuration elements 408 of FIG. 4. But dynamic switch 800 is configured to receive and operate in response to a load control signal ("LD") and a reset signal ("RST"). These signals control an embedded storage element so as to enable dynamic switch 800 to store the static configuration for a specific dynamic switch 800 and to toggle its functionality. That is, these signals enable dynamic switch 800 to toggle operation of silo routing circuit 400, for example, between performing static routing in accordance with that static configuration and performing dynamic operations otherwise. Moreover, dynamic switch 800 is configured to receive its configuration signal, CF, via one of the leg terminal inputs, such as L0 or L1 , rather than over a dedicated interconnect. This configuration therefore enables a further reduction in interconnects, thereby reducing circuit area consumed by silo routing circuit-based routing resources. FIG. 8B shows that dynamic switch 800 includes a dynamic configuration element 850, which is composed of gate 802 and a flip-flop 801 as an exemplary embedded storage element. In this case, the output of flip-flop 801 is a configuration data terminal located internal to the silo routing circuit. As shown, input of flip-flop 801 is coupled to the input 0 terminal, L0 , to receive a configuration data when load signal, LD, is activated. Reset signal, RST, clears flip-flop 801. At least one advantage of this approach is that the static configuration data can be transferred to the routing cells using the same wires used for signal routing.

Figure 9:
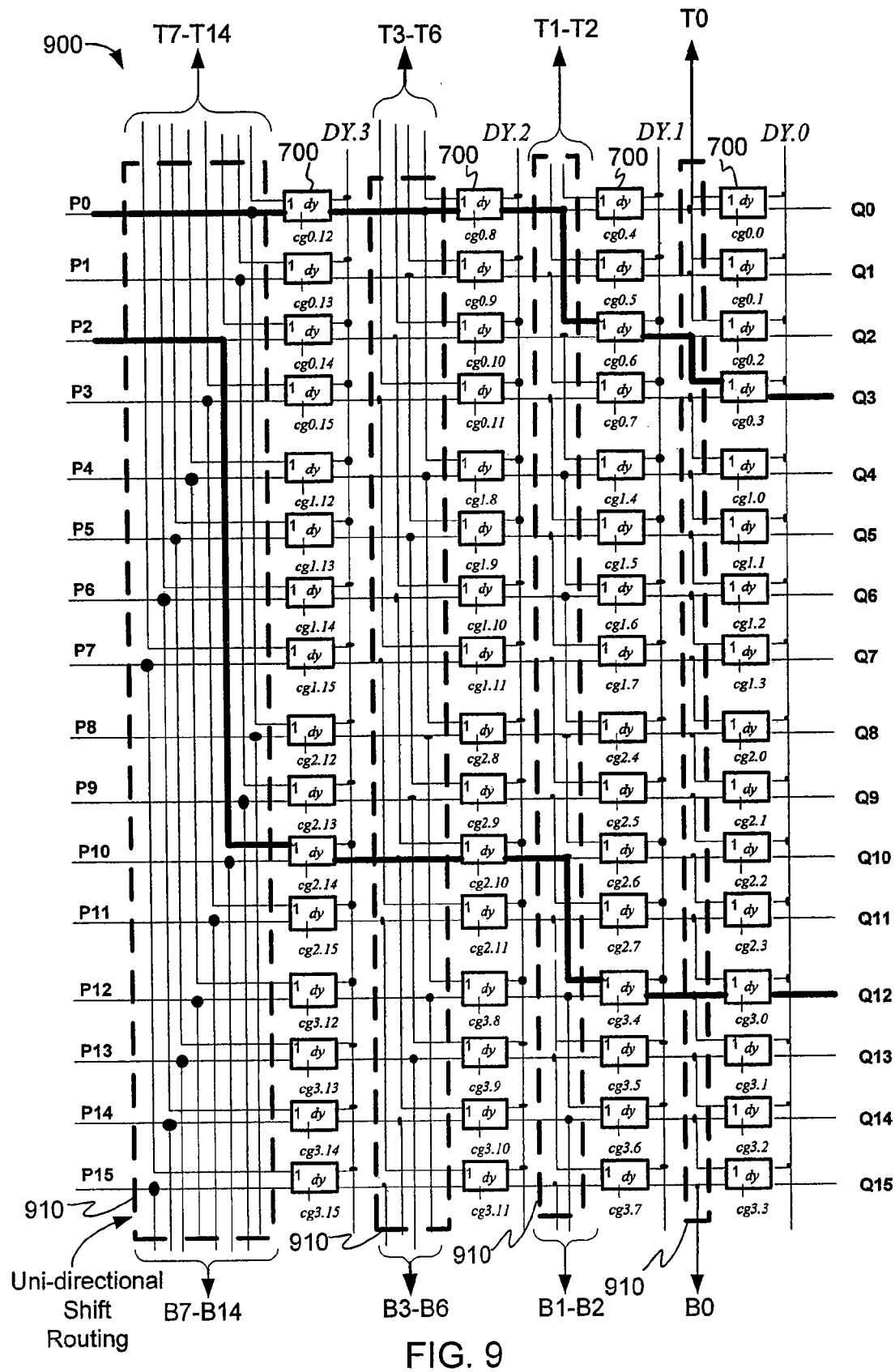
FIG. 9 depicts another silo routing circuit according to one embodiment of the present invention.

FIG. 9 depicts another silo routing circuit according to one embodiment of the present invention. Silo routing circuit 900 is similar in some respects to the structure and functionality of silo routing circuit 500. But silo routing circuit 900 differs from silo routing circuit 500 for at least these reasons: (1) silo routing circuit 900 includes dynamic switches 700 rather than switches 512, and (2) silo routing circuit 900 has fewer wires in interconnect regions 910. Although this restricts dynamic operations, such as shifting or rotating, to only one direction, the number of wires can be reduced about half of silo routing circuit 500. The unidirectional shifting/rotating in this case is restricted to only either a positive distance (e.g., for "a shift left" dynamic operation) or a negative distance (e.g., for "a shift right" dynamic operation). Although silo routing circuit 900 is configured to operate dynamically as a "one-sided" (i.e., uni-directional) left shift circuit, a right shift circuit can be similarly constructed by removing only the positive distance lines (i.e., those lines in "one direction" or a "first direction") rather than the negative distance lines (i.e., those lines in "another direction" or a "second direction"). In practice, a reconfigurable processor or the like can be built such that half of the routers are single-sided left-shift routers and the other half are single-sided right-shift routers. The resulting reconfigurable processor (or reconfigurable logic array) has the same total routing capacity as a silo routing circuit 500, but with half the number of vertical wires. As such, the total number of vertical wires, as well as the circuit area, is reduced compared to the traditional routing structures. Note that signals T0 to T14 and B0 to B14 are representative of signals T and B of FIG. 4, respectively.

Naturally, silo routing circuit 900 and other similar silo routing circuits can be used to implement dynamic shifts that are used as functional operations in reconfigurable processors or the like. For example, in the "C" programming language, a left-shift operation is symbolically coded as "A<<B," which means a word with value "A" is to shift left by the number of bits given by word "B." In a similar manner, the code snippet "A>>B" means that the word "A" is to shift right by "B" binary positions. Since the value B is arbitrary at each step in a computation, the shift amount should be changeable on a dynamic basis to minimize computational delays. So, silo routing circuit 900 or any other silo routing circuit implementing dynamic switches 800 can be used to dynamically modify the shift amount. By contrast, silo routing circuit 500 or any other statically-configured silo routing circuit can be implemented to shift by a constant amount rather than a dynamic amount. This type of shifting is referred as a static shift. Note that statically-configured silo routing circuit includes silo routing circuits 900, but with dynamic switches set to their static configuration.

Figure 10:
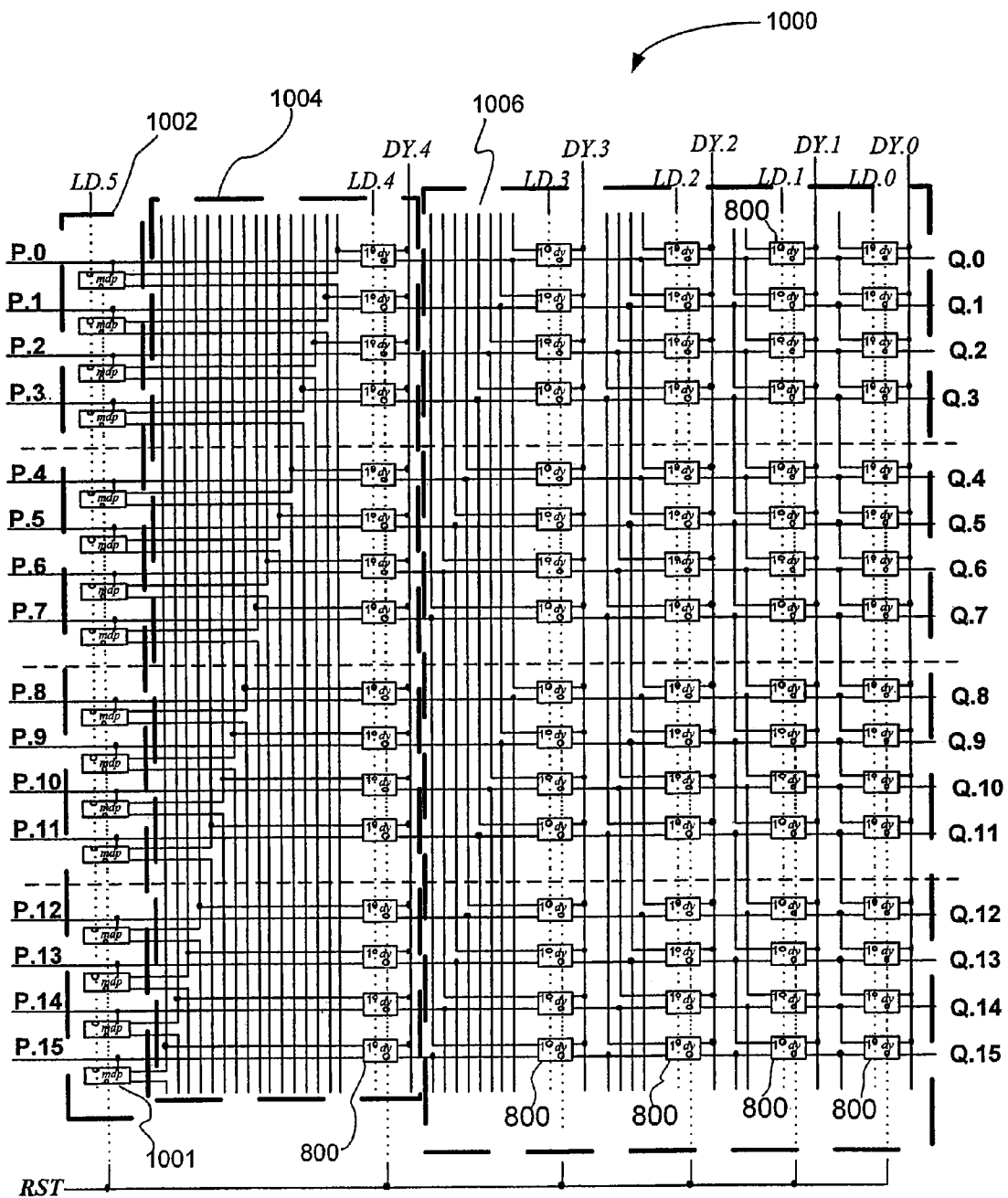
FIG. 10 depicts yet another silo routing circuit according to a specific embodiment of the present invention.

FIG. 10 depicts yet another silo routing circuit according to a specific embodiment of the present invention. Silo routing circuit 1000 includes a one-sided silo routing circuit 1006, as well as a vertical extension circuit 1002 and a horizontal extension circuit 1004. Silo routing circuit 1006 is similar to silo routing circuit 900, but includes dynamic switches 800 rather than dynamic switches 700. Vertical extension circuit 1002 includes switches 1001 for selecting as inputs, such as configuration data bits, data from any of one or more paths from another silo routing circuit (not shown) located either above or below silo routing circuit 1000. Switch 1001 is similar in functionality to dynamic switch 800, but receives primarily vertical signals whereas dynamic switch 800 is configured to receive at least one input P.0 to P.15. Horizontal extension circuit 1004 includes switches 800 for selecting as inputs either one or more horizontal inputs P.0 to P.15 or inputs from another silo routing circuit. As silo routing circuit 1000 includes dynamic switches 800, it can perform dynamic operations, such as shifting or rotating.

Silo routing circuit 1000 operates as follows. The configuration reset signal ("RST") is cycled so that the configuration value of dynamic switches 800, 1001 is a logic 0. In addition, all of the dynamic control signals (DY.0, DY.1, etc.) are set to a logic 0 state. With these settings, the data presented to each of the input lines Pj (e.g., P.0 to P.15) flows through each stage to the output lines Qj (e.g., Q.0 to Q.15). A configuration word for the right-most column associated with load signal, LD.0, is presented to the inputs P. These values are the inputs to dynamic switches 800 in the right-most column (i.e., the last stage). The signal LD.0 is then cycled so that the configuration data is loaded into the registers (e.g., the flip-flops) of dynamic switches of that last stage. Configuration data is then presented to the fifth column from the left (i.e., column associated with load signal, LD.4) and the previous steps are repeated until all of the configuration data registers of dynamic switches 800 are loaded.

Figure 11:
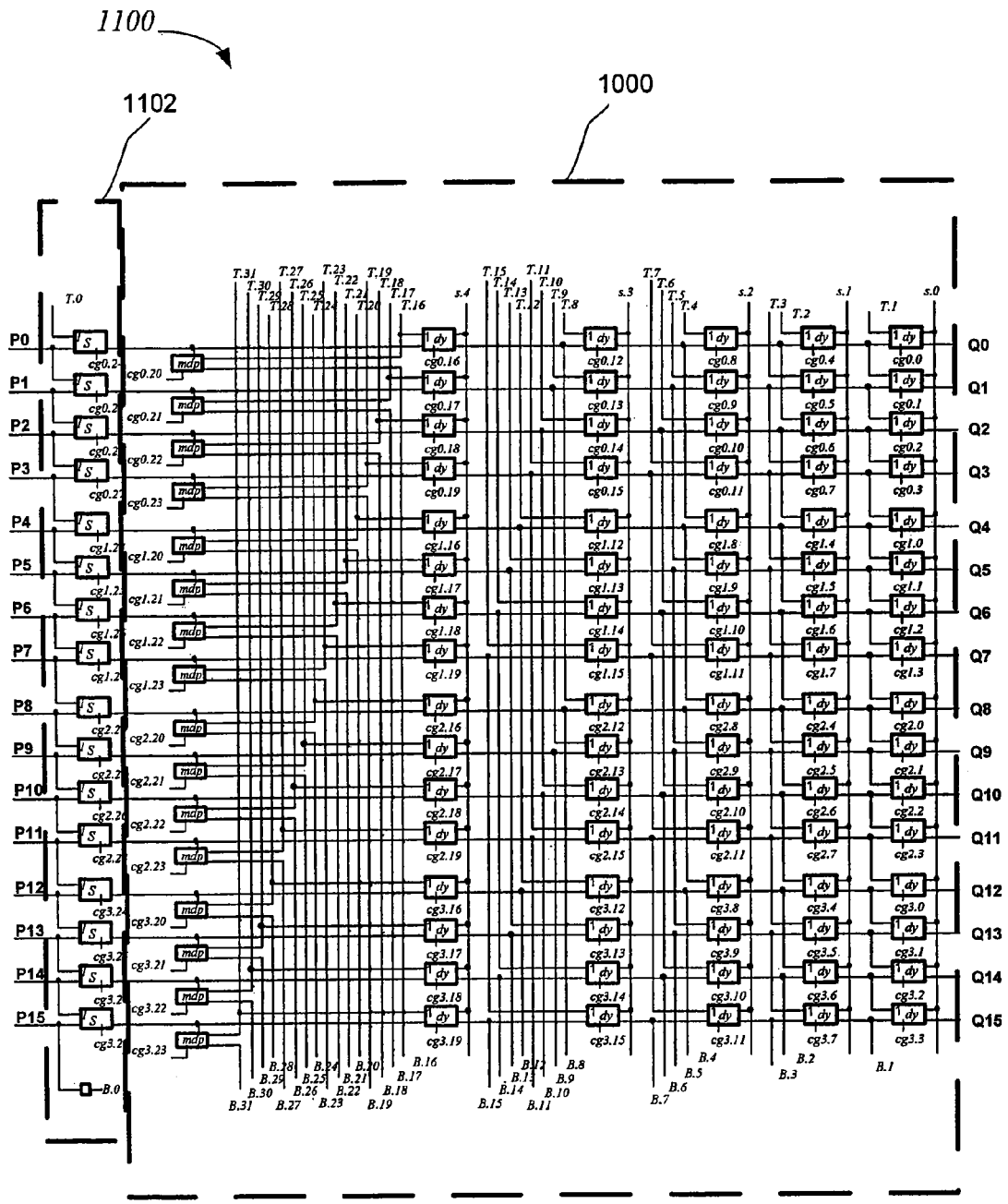
FIG. 11 depicts still yet another silo routing circuit according to a specific embodiment of the present invention.

FIG. 11 depicts still yet another silo routing circuit according to a specific embodiment of the present invention. Silo routing circuit 1100 includes a one-sided silo routing circuit 1000 of FIG. 10 and a "distance-1" stage circuit 1102. This "distance-1" stage circuit 1102 is added as the first (leftmost) stage of silo routing circuit 1100 and provides two possible paths from each input to each output rather than just one path. In particular, "distance-1" stage circuit 1102 is configured to relieve or avoid "blockage" conditions where two paths from two different inputs to two different outputs collide in the use of one of the same switches. As one switch cannot be used for two separate paths, a place and route software program or other steps in manufacturing silo routing circuits should be configured to change the placement so that only one of the two paths is actually used. As such, if one of the paths into or out of silo routing circuit 1000 becomes blocked because that path is already needed, then the second path is used to perform the connection. This significantly improves the probability of a satisfactory placement of functions into the programmable array.

Figure 12:
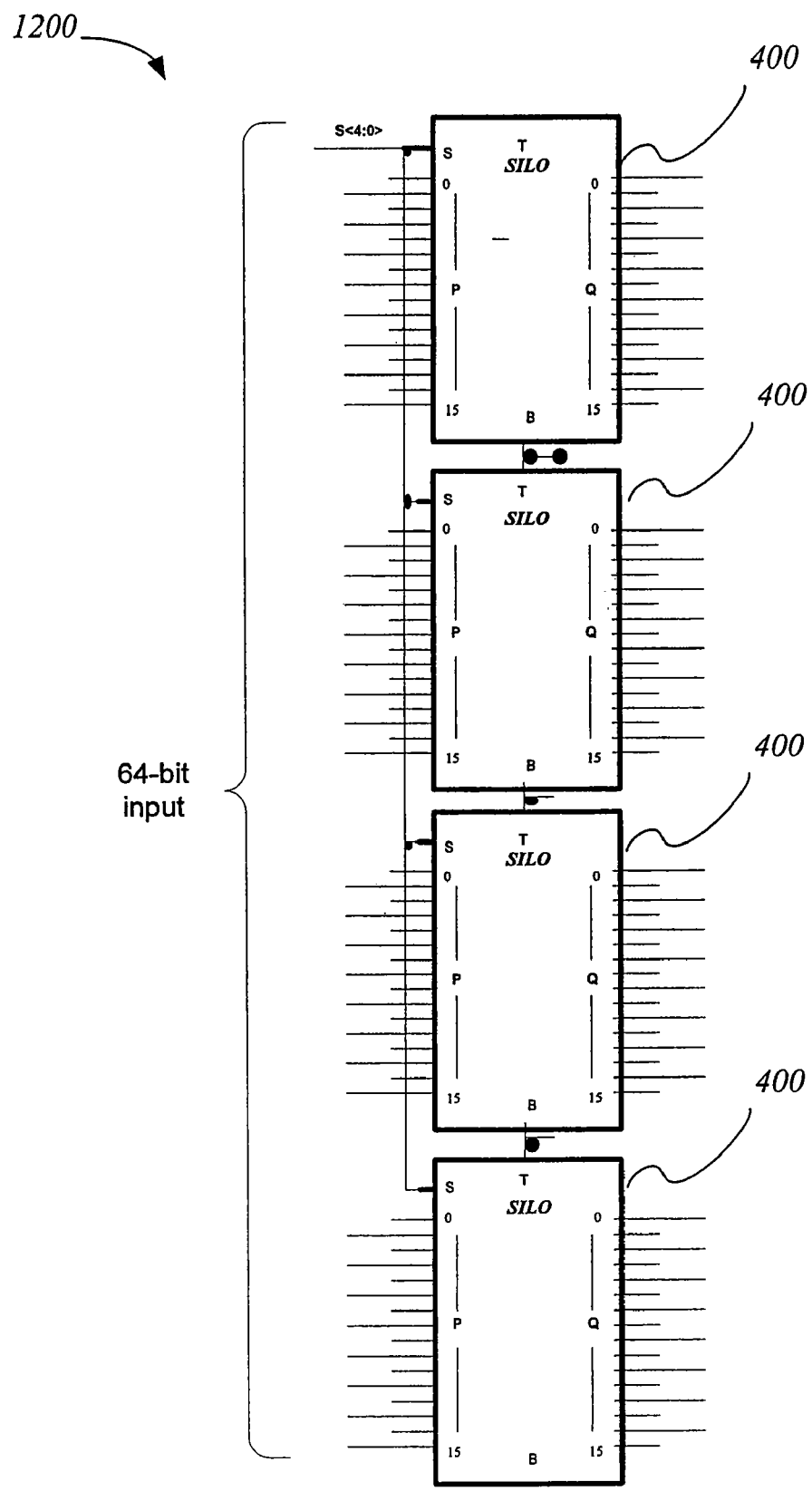
FIG. 12 is an exemplary silo router constructed as a 64-bit router block using four 16-bit silo routing circuits of FIG. 10, according to one embodiment of the present invention.

FIG. 12 is an exemplary silo router 1200 constructed as a 64-bit router block using four 16-bit silo routing circuits 1000 of FIG. 10, according to one embodiment of the present invention. Note that vertical extension circuit 1002 and horizontal extension circuit 1004 enable several silo routing blocks 400 to be combined to construct larger routers, such as silo router 1200. Note that the "T" and "B" signals in FIG. 12 illustrate the vertical flow of data from one block to the next. In this case, the four "S" signals ("s<4:0>") function as control signals DY.0 to DY.4 of silo routing circuits 1000 to dynamically shift bits up to 31 positions of the 64-bit input data. Although silo router 1200 of FIG. 12 is shown as being 64 bits wide, it can be any number of bits wide.

Figure 13:
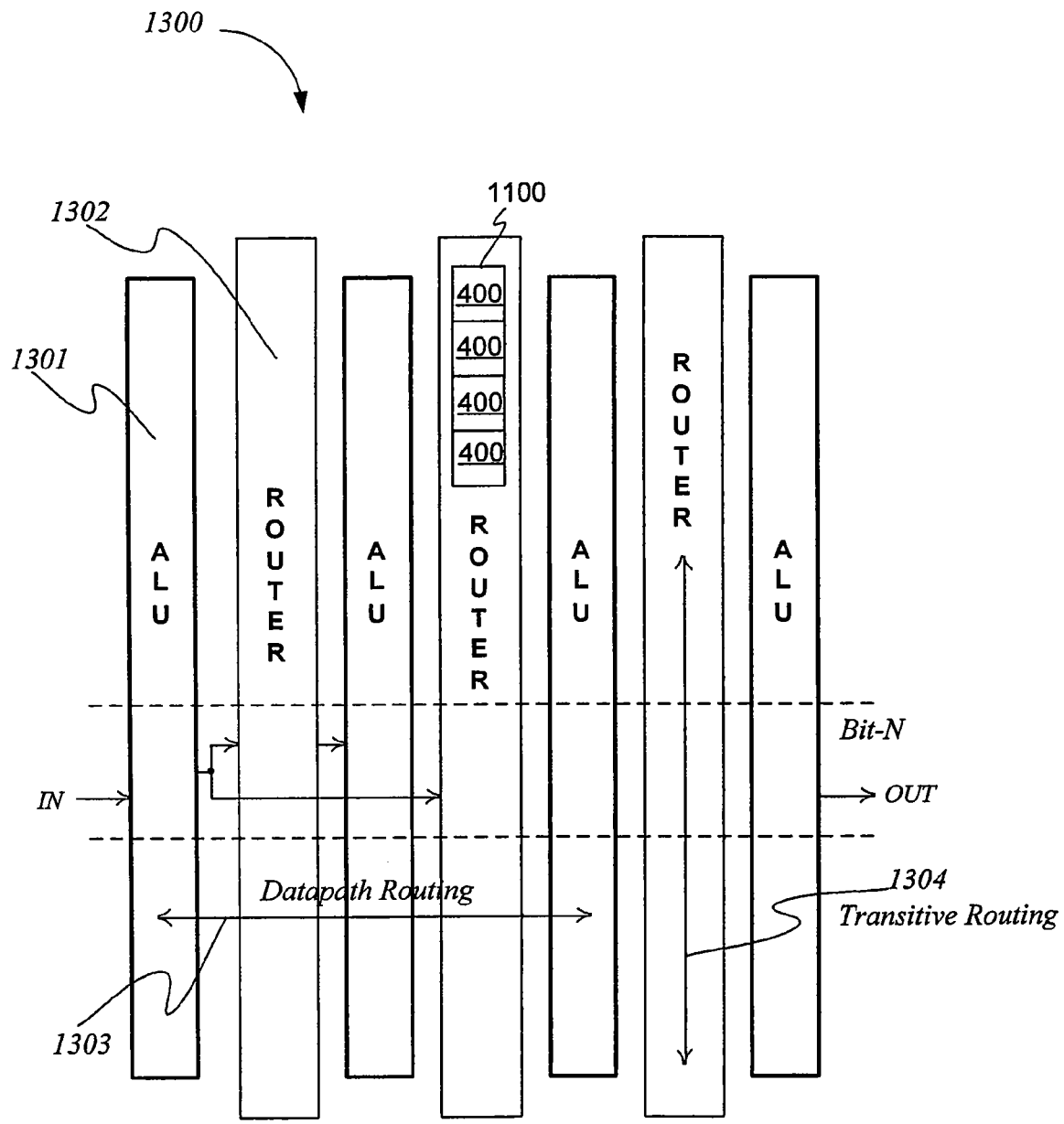
FIG. 13 depicts a diagrammatic representation of at least one type of reconfigurable logic array including a silo routing circuit in accordance with an embodiment of the present invention.

FIG. 13 depicts a diagrammatic representation of at least one type of reconfigurable logic array including silo routing circuit 400 in accordance with an embodiment of the present invention. A reconfigurable data-path processor 1300 includes a number of columns 1301 each containing programmable Arithmetic Logic Units ("ALUs") blocks. Further, each of the ALU blocks includes one or more reconfigurable computational elements. Other vertical routing blocks, which are called transitive routers 1302, separate columns 1301 of ALU blocks. Transitive routers 1302 are routing circuits that facilitate the orthogonal flow of bit information called "transitive flow" 1304, which is orthogonal to data-path routing 1303. Horizontal routing is accomplished within the ALUs using traditional data path-oriented routing circuits 1303. The transitive routing circuits allow static shifts and bit-field manipulation to be performed as part of the arithmetic process. For example, the addition of two numbers A and B might require the bits of the B input to be reversed in any ALU of ALU blocks. As shown, a number of silo routing circuits 400 constitute silo router 1200, which can be one of many to form transitive routers 1302.

In a specific embodiment, reconfigurable data-path processor 1300 is similar to either the structure or the functionality, or both, of at least one of the reconfigurable data-path processors, in whole or in part, as disclosed in U.S. patent application Ser. No. 10/746,018 entitled "Architecture and Method for Reconfigurable Data Path Processing," naming as inventors Charle' Rupp and Jeff Arnold, filed on Dec. 23, 2003 with Attorney Docket No. STRE-009/00US, which is incorporated by reference in its entirety for all purposes. And as such, silo routing circuit 400 and silo router 1200 can be configured to provide, as part of the global and/or local routing resources of a reconfigurable data-path processor, the transitive and/or global vertical routing for that processor. Moreover, silo routing circuit 400 and silo router 1200 can provide the routing resources for reconfigurable logic arrays composed of modular processing elements ("MPEs") as reconfigurable computational elements.

Figure 14:
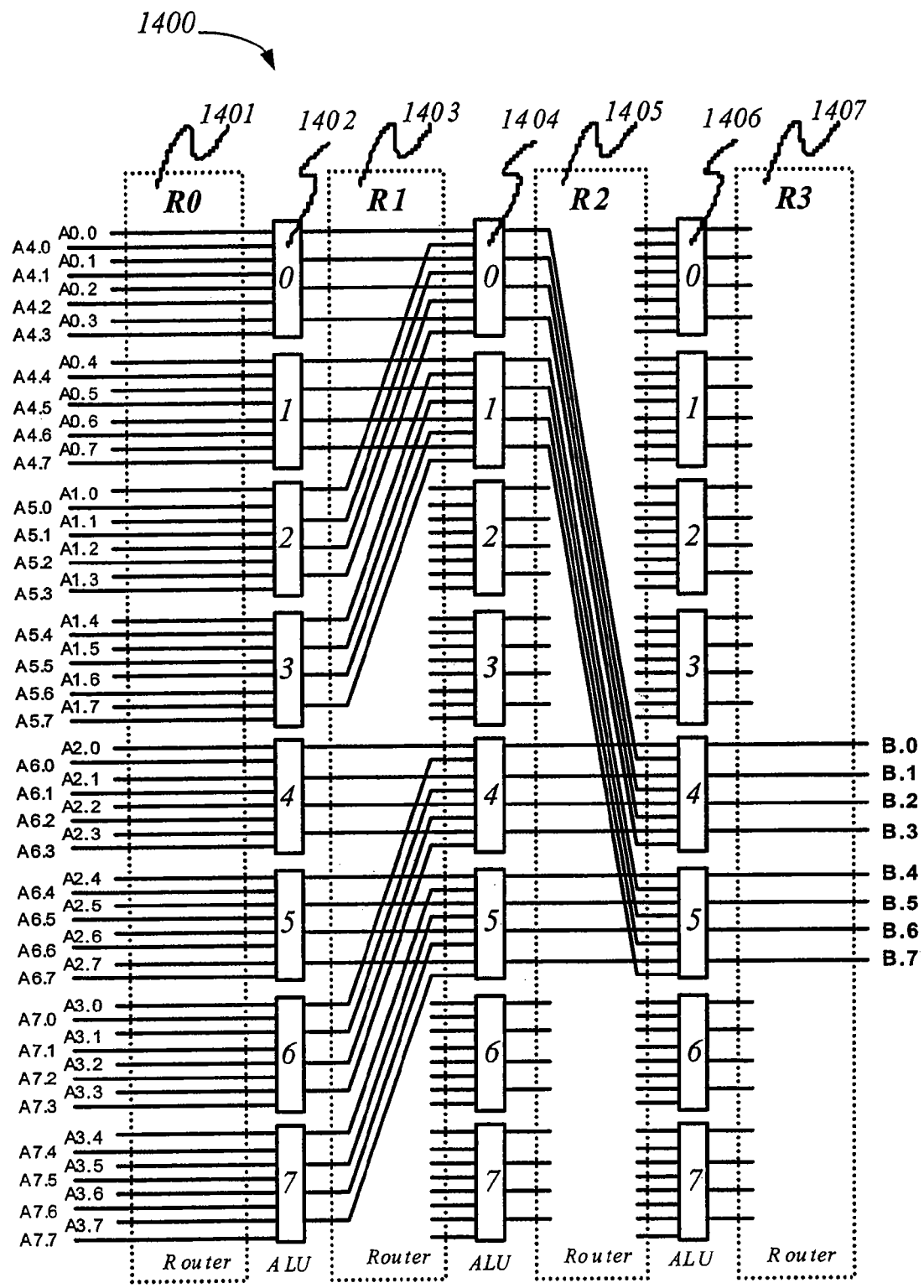
FIG. 14 illustrates an example of using silo routing circuits in a reconfigurable logic array system, according to one embodiment of the present invention.

FIG. 14 illustrates an example of using silo routing circuits 400 in a reconfigurable logic array system, according to one embodiment of the present invention. In this instance, reconfigurable logic array system 1400 is a reconfigurable data-path system configured to perform a summation of eight numbers in parallel using statically-programmed silo routing circuits 400 (or alternatively silo router 1200) to align one of the input operands to each addition. System 1400 includes columns of reconfigurable computational elements as programmable Arithmetic Logic Units ("ALUs"), which are shown as ALU column 1402, ALU column 1404, and ALU column 1406. Silo routers ("R0") 1401, ("R1") 1403, ("R2") 1405 and ("R3") 1407 are arranged on each side of the array (i.e., system 1400) as well as between pairs of ALU columns and are used to route signals to one of the two operands of each ALU. The L1 input to each ALU can be from a traditional horizontal routing resource. To illustrate the usefulness of this structure, consider the problem of adding eight numbers in parallel. The numbers are presented to the left side of the array as the values A0, A1, through A7. For this example, each word has eight bits. The first stage of the program in the left most ALU column uses four adders to add four pairs of input values. For example, ALUs 0 and 1 in column 1402 add words A0 plus A4. Silo router ("R1") 1403 is statically programmed to shift the bits of the result of two of these additions so that the four intermediate sums are added in ALU column 1404 to realize just two intermediate values. Silo router ("R2") 1405 is statically programmed to shift the value of one of the result values to be added to the other to get the final result word "B" in the final column. This particular program can now operate at very high speed because of the use of parallel adders. The addition of pipeline registers to each ALU (e.g., ALUs 0 to 7) would allow this program to output a new result on each clock cycle.

Figure 15:
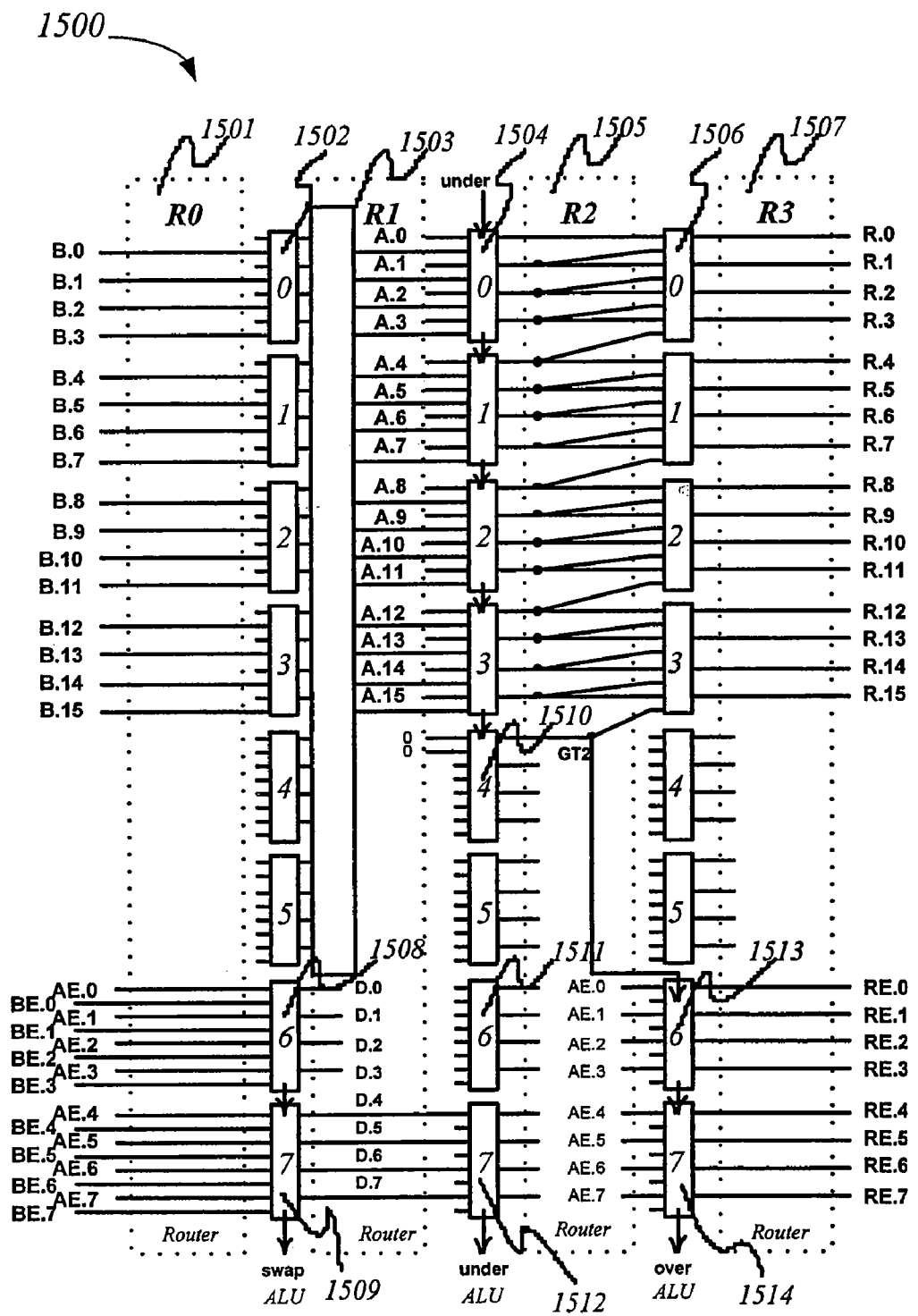
FIG. 15 shows another example of the use of silo routing circuits to perform floating-point addition in accordance with one embodiment of the present invention.

FIG. 15 shows another example of the use of silo routing circuits 400 to perform floating-point addition in accordance with one embodiment of the present invention. In this example, the dynamic shift capability of one of the silo routers 1200 is used to perform mantissa alignment of one of the operands while another silo router 1200 is used to statically shift the result value to perform mantissa normalization. As with the example of FIG. 14, system 1500 can use a reconfigurable data path. Namely, system 1500 includes columns of reconfigurable computational elements as programmable Arithmetic Logic Units ("ALUs"), which are shown as ALU column 1502, ALU column 1504, and ALU column 1506. Silo routers ("R0") 1501, ("R1") 1503, ("R2") 1505 and ("R3") 1507 are arranged on each side of the array (i.e., system 1500) as well as between pairs of ALU columns and are used to route signals to one of the two operands of each ALU.

Consider that the numbers to be added are [AE,A] representing the exponent ("AE") and mantissa ("A") of one number, and [BE,B] representing the exponent ("BE") and mantissa ("B") of the second number. Further, suppose that the exponent words AE and BE are eight bit values and that the mantissa words are 16-bit values so that each mantissa value represents a fractional number between 1 and 2. A reconfigurable data-path system 1500 for this problem consists an eight-bit data path for the exponent values and a 16-bit datapath for the mantissa part of the values. Next, presume that the exponent value AE is equal to or greater than the value of BE. As such, the mantissa B must be shifted right before the mantissa values are added. The amount to be shifted is determined by the ALUs 1508 and 1509 that are programmed to subtract BE from AE.

When the result of the subtract operation is a negative number as indicated by a borrow output of the ALU, then BE>AE and we must swap the A and B values. When AE>=BE, the difference result word D.7, . . . , D.0 in the figure indicates the number of bits by which the B mantissa must be shifted so that the value is aligned with the A mantissa value. If the shift amount is greater than or equal to 16 as indicated by one the bits D.4, D.5, D.6 or D.7 having a value of 1, then the value of B is much smaller than value of A and the result value will be the same as the original A value. Otherwise, the difference value D[3:0] is used as a dynamic shift value for the silo router 1503 in the figure to shift the B mantissa to the right by the necessary amount. The sum of the mantissas is then computed in ALUs 1511 and 1512 of column 1504. When the mantissa sum of A plus B-shifted is larger than 2, the result must be normalized (made smaller than 2). This is detected as the carry output of the adder using the signal GT2 in FIG. 15 from ALU 1510. This value is then used to shift the mantissa value one position to right using the static router pattern in column 1505 (having the effect of dividing the mantissa by 2) and the exponent value of the result is incremented by ALUs 1513 and 1514 to get the final result exponent RE.

Various structures and methods for designing and manufacturing integrated circuits, such as reconfigurable processors, are described herein. The methods can be governed by or include software processes, for example, as part of a design tool kit. Generally, such a tool kit includes computer readable medium that enables electronic device designers to design, develop and manufacture ICs in accordance with the present invention. In one embodiment, a place and route software program embedded in a computer readable medium contains instructions for execution on a computer to form one or more silo router circuits 400 and/or silo routers 1200, according to rules described above to determine distances and bit vectors for setting switches, among others things. Further the embodiments described herein are applicable to any technology used to implement reconfigurable processors, including Complex Programmable Logic Devices ("CPLDs"), Field Programmable Gate Arrays ("FPGAs"), and Reconfigurable Processing Arrays ("RPAs"), all of which are examples of integrated circuits that are composed of reconfigurable logic arrays on one or more semiconductor substrates.

An embodiment of the present invention relates to a computer storage product with a computer-readable medium having computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs and holographic devices; magneto-optical media such as floptical disks; and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher-level code that are executed by a computer using an interpreter. For example, an embodiment of the invention may be implemented using Java, C++, or other object-oriented programming language and development tools. Another embodiment of the invention may be implemented in hardwired circuitry in place of, or in combination with, machine-executable software instructions.

The foregoing description, for purposes of explanation, used specific nomenclature to provide a thorough understanding of the invention. However, it will be apparent to one skilled in the art that nomenclature selected herein is presented to teach certain aspects of the present invention and is not intended to restrict the implementations of the various embodiments. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

The invention claimed is:

1. A reconfigurable logic array for implementing a reconfigurable data-path processor formed on a semiconductor substrate, the reconfigurable logic array comprising:
  a plurality of reconfigurable computational elements; and
  a plurality of silo routers, the plurality of silo routers including a silo router that includes a plurality of silo router circuits located between at least a first reconfigurable computational element from the plurality of reconfigurable computation elements and a second reconfigurable computational element from the plurality of reconfigurable computation elements, said plurality of silo routers configured to perform bit permutations on data being transmitted from said first reconfigurable computational element to said second reconfigurable computational element,
  the plurality of silo routers including the silo router having:
    a plurality of input terminals and a plurality of output terminals, said plurality of output terminals including a first output terminal and a second output terminal;
    a plurality of switches; and
    a plurality of configuration data terminals configured to select a subset of the plurality of switches such that the subset of the plurality of switches defines at least a portion of a data path between at least one of the plurality of input terminals and at least one of the plurality of output terminals,
    said second output terminal being separated from said first output terminal by a distance defined based on a bit vector applied to a subset of the plurality of configuration data terminals, said distance being a displacement in a quantity of output terminals from said first output terminal,
    the plurality of switches having a switch in a first stage of switches, the switch in the first stage of switches being at least a binary switch having at least a first input terminal configured to receive data from a first switch in a second stage of switches without the data being transmitted through another of the plurality of switches, the switch in the first stage switches having a second input terminal configured to receive data from a second switch in the second stage of switches without the data being transmitted through another of the plurality of switches, the second switch in the second stage of switches being in a row of switches located $2^{M-k}$ rows from a row of switches including the switch in the first stage of switches, M being a number representing a total number of stages of switches defined by the plurality of switches and k being a number representing an order of the first stage of switches within the total number of stages of switches.

2. The reconfigurable logic array of claim 1, wherein said plurality of silo routers are further configured to route data from said first reconfigurable computational element to said second reconfigurable computational element substantially orthogonal to data flowing through said first and said second reconfigurable computational elements.

3. The reconfigurable logic array of claim 2, further comprising a plurality of dynamic switches each configurable to either statically route data or dynamically route data from said first reconfigurable computational element to said second reconfigurable computational element.

4. The reconfigurable logic array of claim 3, wherein said plurality of dynamic switches further comprises a plurality of dynamic configuration elements including:
  a plurality of embedded storage elements for storing configuration data configured to trigger at least one of said plurality of silo routers to statically route data from said first reconfigurable computational element to said second reconfigurable computational element; and
  a plurality of dynamic control selector gates configured to override said configuration data such that data is dynamically routed through said plurality of dynamic switches.

5. The reconfigurable logic array of claim 1, wherein said plurality of reconfigurable computational elements constitute a number of arithmetic logic unit ("ALU") blocks and said plurality of silo routers constitute a number of transitive routers.

6. The reconfigurable logic array of claim 1, wherein said bit permutations include one or more of bit reversal operations, bit swapping operations, bit rotation operations and bit shifting operations.

7. The reconfigurable logic array of claim 1, wherein at least one of said silo routers includes a one-sided silo router circuit configured to perform either a shift right operation or a shift left operation.

8. The reconfigurable logic array of claim 1, wherein the first stage of switches and the second stage of switches are logically disposed between a third stage of switches from the plurality of switches and a fourth stage of switches from the plurality of switches.

9. The reconfigurable logic array of claim 1, wherein M is greater than three.

10. The reconfigurable logic array of claim 1, wherein the first stage of switches is adjacent to the second stage of switches.

* * * * *